US010021726B2

(12) United States Patent
Wang et al.

(10) Patent No.: US 10,021,726 B2
(45) Date of Patent: Jul. 10, 2018

(54) METHOD AND DEVICE FOR IMPLEMENTING PROXIMITY COMMUNICATION SERVICE

(71) Applicant: CHINA ACADEMY OF TELECOMMUNICATIONS TECHNOLOGY, Beijing (CN)

(72) Inventors: Hucheng Wang, Beijing (CN); Shanzhi Chen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 192 days.

(21) Appl. No.: 14/780,566

(22) PCT Filed: Mar. 31, 2014

(86) PCT No.: PCT/CN2014/074385
§ 371 (c)(1),
(2) Date: Sep. 28, 2015

(87) PCT Pub. No.: WO2014/161449
PCT Pub. Date: Oct. 9, 2014

(65) Prior Publication Data
US 2016/0057793 A1 Feb. 25, 2016

(30) Foreign Application Priority Data

Apr. 1, 2013 (CN) .......................... 2013 1 0111483

(51) Int. Cl.
*H04L 12/28* (2006.01)
*H04W 76/02* (2009.01)
(Continued)

(52) U.S. Cl.
CPC ........... *H04W 76/023* (2013.01); *H04W 8/26* (2013.01); *H04W 48/16* (2013.01); *H04W 48/18* (2013.01); *H04W 76/021* (2013.01); *H04W 88/02* (2013.01)

(58) Field of Classification Search
CPC ................................................ H04W 72/0406
(Continued)

(56) References Cited

U.S. PATENT DOCUMENTS

2010/0009675 A1 1/2010 Wijting et al.
2011/0098043 A1 4/2011 Yu et al.
(Continued)

FOREIGN PATENT DOCUMENTS

CN 102172093 A 8/2011
CN 102857901 A 1/2013
(Continued)

OTHER PUBLICATIONS

First Office Action regarding Chinese Application No. 201310111483.8, dated Feb. 27, 2017. Translation provided by EPO.
(Continued)

*Primary Examiner* — Dang Ton
(74) *Attorney, Agent, or Firm* — Pro-Techtor International Services; Ian Oglesby

(57) ABSTRACT

The present disclosure provides a method and a device for implementing a proximity communication service. The method includes steps of: receiving a request for the proximity communication service from a UE; in accordance with the request for the proximity communication service from the UE, determining a proximity communication service identifier obtained when the UE subscribes for the proximity communication service; and in accordance with the proximity communication service identifier of the UE, implementing the proximity communication service. According to
(Continued)

the present disclosure, it is able to prevent the situation where the proximity communication service cannot be implemented when a UE's 3GPP network layer identifier cannot be determined in accordance with a UE's application layer identifier, thereby to implement the proximity communication service of the UE.

20 Claims, 9 Drawing Sheets

(51) Int. Cl.
*H04W 8/26* (2009.01)
*H04W 48/16* (2009.01)
*H04W 48/18* (2009.01)
*H04W 88/02* (2009.01)

(58) Field of Classification Search
USPC .......................................................... 370/329
See application file for complete search history.

(56) References Cited

U.S. PATENT DOCUMENTS

| | | | |
|---|---|---|---|
| 2011/0294474 A1 | 12/2011 | Barany et al. | |
| 2013/0073671 A1 | 3/2013 | Nagpal et al. | |
| 2014/0372775 A1* | 12/2014 | Li | H04L 49/405 713/300 |
| 2015/0201318 A1* | 7/2015 | Singh | H04W 8/005 455/434 |

FOREIGN PATENT DOCUMENTS

| | | |
|---|---|---|
| CN | 103096290 A | 5/2013 |
| CN | 103209412 A | 7/2013 |
| EP | 2487973 A1 | 8/2012 |
| JP | 2008124532 A | 5/2008 |
| JP | 2009111496 A | 5/2009 |
| WO | WO2004004395 A1 | 1/2004 |
| WO | WO2010018452 A1 | 2/2010 |
| WO | WO2011153269 A1 | 12/2011 |

OTHER PUBLICATIONS

International Search Report and Written Opinion of the International Searching Authority for International Application No. PCT/CN2014/074385, dated Jun. 11, 2014. Translation provided by WIPO.
EPO Supplementary Search Report and Opinion for EPO application No. 14778083.7 dated Jul. 7, 2016.
Office action from Korean Patent Application No. 10-2015-7031085 dated Oct. 20, 2016, and its English translation.
Office action from Korean Patent Application No. 10-2015-7031085 dated Apr. 18, 2017, and its English translation.
Office action from Japanese Patent Application No. 2016-505691 dated Aug. 23, 2016, and its English translation.
Office action from Japanese Patent Application No. 2016-505691 dated Apr. 11, 2017, and its English translation.
Office action from TW Patent Application No. 10420671200 dated May 25, 2015, and its English translation.
ZTE,"Clarification of requirements on application visibility of ProSe status" 3GPP TSG-SA WG1 Meeting #59, S1-122074, Jul. 30-Aug. 3, 2012, Chicago, US.
Qualcomm Inc., Alcatel-Lucent, Interdigital, NeuStar, ETRI, US Department of Commerce "Usefulness and Identifiers to use with ProSe Discovery" 3GPP TSG-SA WG1 Meeting #60, S1-124013, Nov. 12-17, 2012, Edinburgh, United Kingdom.
"ProSe discovery using direct radio signals" Possible system architecture and required functionality, S2-130325.
Huawei,"Considerations for D2D Proximity Service support in E-UTRAN" 3GPP TSG RAN WG3 Meeting #79, R3-130116, Jan. 28-Feb. 1, 2013, St. Julian's, Malta.

* cited by examiner

METHOD AND DEVICE FOR IMPLEMENTING PROXIMITY COMMUNICATION SERVICE

CROSS-REFERENCE TO RELATED APPLICATION

The present application claims a priority of the Chinese patent application No. 201310111483.8 filed on Apr. 1, 2013 and entitled "Method and Device for Implementing Proximity Communication Service", which is incorporated herein by reference in its entirety.

TECHNICAL FIELD

The present disclosure relates to the field of communication technologies, in particular to a method and a device for implementing a proximity communication service.

BACKGROUND

A research on proximity communication between devices is being performed by the 3$^{rd}$ Generation Partnership Project (3GPP) at present. As its main application scenario, when there is a short distance between two devices in communication with each other, an application layer data transmission may be performed directly between the two devices rather than through a mobile communication network, or forwarded by a serving base station connected to the devices rather than through a core network. For this purpose, it is required to study how the application layer can trigger a network layer to find a proximity relation and establish the proximity communication, and how an application layer user service identifier (ID) can be associated with a network layer identifier.

FIG. 1 shows a data channel for the communication between two devices defined in 3GPP. The data is transmitted by a User Equipment 1 (UE1) to a serving evolved Node B (eNB), and then transmitted by the eNB to a Serving Gate-Way (SGW) and a Packet Data Network Gate-Way (PGW) of a serving core network. Next, in accordance with a routing table of UE, the data is routed by the PGW to a serving PGW and a Serving GW of the UE1, and transmitted by the Serving GW of a UE2 to a serving eNB of the UE2, and then transmitted to the UE2 by the eNB. In the example shown in FIG. 1, the Serving GW and PGW of UE1 is identical to that of UE2, and a process of routing the data to the PGW served for UE2 from the PGW served for UE is omitted.

As can be seen from FIG. 1, even when there is a very short distance between the two devices in communication with each other, it is still required to transmit the data from one to another through the serving eNBs and the core network, which thus results in a large communication delay as well as additional network resource usage. Hence, a communication technique for proximal devices is being studied by the 3GPP, so as to achieve the communication directly between two UEs or merely by means of the eNB when there is a very short distance between two UEs.

FIGS. 2a and 2b show data transmission paths between two terminals after the proximity communication is implemented. As shown in FIGS. 2a and 2b, the data may be transmitted directly between the UE1 and UE2 rather than through a mobile network device, or when two UEs are connected to an identical eNB, the data may be forwarded through this serving eNB rather than through the core network. Through this transmission mode, it is able to reduce the delay for the data transmission, and save the network resources, especially the resources of the core network.

Requirements for the proximity communication are being discussed in 3GPP SA1. On the basis of the results of the discussion, generally there are two problems in the proximity communication. i.e., how to discover the proximity relation between the terminals, and how the proximal UEs can communicate with each other directly.

The discovery process for the proximity relation between the terminals is a prerequisite to the direct communication between the proximal terminals, and meanwhile it may be applied in various scenarios. For example, a shop may, through detecting the proximity relation, send discounting or promoting advertisements to the terminals held by passersby, a user may search information about restaurants and supermarkets in proximity to a current position on the basis of a proximity relation discovery function, and a bus stop may forecast bus arrival information on the basis of the proximity relation discovery function.

Such direction communication between the UEs still needs to be controlled through a network, and the resources for a proximity communication service (ProSe) are determined by the network. Hence, information interaction will also occur between the serving eNB of the UE and a Mobile Management Entity (MME). When two UEs in the proximity communication reside in different eNBs, signaling interaction may also occur between the core network and these eNBs, respectively.

A scenario where the discovery of the proximity relation is restrained has been defined in the 3GPP. To be specific, when a service provider provides authorization for a certain service that it may use a proximity service feature and a user owns a terminal which is allowed to use the proximity service, he may discover his nearby friend who also owns a terminal with the same feature, and he may also be discovered by his friend.

The proximity service feature may also be used by a Social Network Service (SNS) application. For example, when a certain SNS application is used by Mary, Peter and John, the following relation information is displayed in the context maintained at its application layer: Mary and John are friends, John and Peter are friends, and Mary and Peter are not friends.

Presumed that Mary, Peter and John own the terminals with the proximity service feature, have subscribed to an identical cellular network service provider, and the service provider has authorized them to use the proximity service feature, the following functions need to be achieved in this scenario. Mary's UE may discover that John is at a proximal position, John's UE may discover that Mary is at a proximal position, Mary's SNS application can know whether or not John is at a proximal position. John's SNS application can know whether or not Mary is at a proximal position. Peter's UE cannot discover that Mary's UE is at a proximal position, Mary's SNS application cannot detect whether or not Peter is at a proximal position, and Peter's SNS application cannot detect whether or not Mary is at a proximal position.

Hence, it is required by this feature that merely the friends can discover the proximity relation, and when the users are not friends as displayed at the application layer, it is impossible for them to discover the proximity relation.

The proximity relation discovery feature between UEs may also be controlled by the service provider. For a UE with a proximity relation discovery function, the following features may be configured for the UE by strategy and user selection. It may discover the proximal UEs but cannot be discovered by the others, it may be discovered by the other UEs but cannot discover the others, it may discover the other UEs and can be discovered by the others, it cannot be discovered by the other UEs and cannot discover the others, or during the proximity relation discovery process, it may merely discover the UEs that have been set as being allowed to be discovered by the others.

Hence, in accordance with the present requirements on the proximity communication service defined by the 3GPP, the terminal is required to, when triggered by the application layer, initiate the proximity communication service including the discovery of the proximity relation and the establishment of the proximity communication connection. These requirements are related to such factors as proximity relation subscription information about the terminal, network configuration and user relation at the application layer. Due to the various applications on the terminal, there are various application layer identifiers, and it is impossible for a 3GPP network to associate all the application layer identifiers on the UE with the UE's 3GPP network layer identifiers. In addition, the application layer is independent of the network layer, and a user may log in a certain application on a terminal A or B, so it is difficult for the 3GPP network to maintain an association relationship between the user's application layer identifier and the UE's 3GPP network layer identifier.

Based on the above, when the application on the UE requires the use of the proximity communication service, including the discovery of the proximity relation and the establishment of the proximity communication connection, it is impossible for the network to determine the UE's 3GPP network layer identifier in accordance with the user's application layer identifier, so it is impossible to perform the proximity communication service.

SUMMARY

An object of the present disclosure is to provide a method and a device for implementing a proximity communication service, so as to implement the proximity communication services between UEs.

In one aspect, the present disclosure provides a method for implementing a proximity communication service, including steps of: receiving a request for the proximity communication service from a UE; in accordance with the request for the proximity communication service from the UE, determining a proximity communication service identifier obtained when the UE subscribes for the proximity communication service; and in accordance with the proximity communication service identifier of the UE, implementing the proximity communication service.

In another aspect, the present disclosure provides in one embodiment a device for implementing a proximity communication service, including: a reception unit configured to receive a request for the proximity communication service from a UE; a determination unit configured to, in accordance with the request for the proximity communication service from the UE, determine a proximity communication service identifier obtained when the UE subscribes for the proximity communication service; and a processing unit configured to, in accordance with the proximity communication service identifier of the UE, implement the proximity communication service.

In yet another aspect, the present disclosure provides in one embodiment a device for implementing a proximity communication service, including a memory and a processor. The processor is configured to execute a computer program having the following functions: receiving a request for the proximity communication service from a UE; in accordance with the request for the proximity communication service from the UE, determining a proximity communication service identifier obtained when the UE subscribes for the proximity communication service, and in accordance with the proximity communication service identifier of the UE, implementing the proximity communication service. The memory is configured to store codes of the computer program.

According to the method and the device for implementing the proximity communication service in the embodiments of the present disclosure, when the UE subscribes for the proximity communication service, the proximity communication service identifier is allocated to the UE. In this way, after receiving the request for the proximity communication service from the UE, the proximity communication service identifier of the UE may be determined in accordance with the request, and then the proximity communication service may be implemented in accordance with the proximity communication service identifier. As a result, it is able to prevent the situation where the proximity communication service cannot be implemented when a UE's 3GPP network layer identifier cannot be determined in accordance with a UE's application layer identifier, thereby to implement the proximity communication service of the UE.

DETAILED DESCRIPTION

According to a method and a device for implementing a proximity communication service in the embodiments of the present disclosure, when a UE subscribes for the proximity communication service, a proximity communication service identifier is allocated to the UE. In this way, after receiving a request for the proximity communication service from the UE, the proximity communication service identifier of the UE may be determined in accordance with the request, and then the proximity communication service may be implemented in accordance with the proximity communication service identifier. As a result, it is able to prevent the situation where the proximity communication service cannot be implemented when a UE's 3GPP network layer identifier cannot be determined in accordance with a UE's application layer identifier, thereby to implement the proximity communication service of the UE.

Figure 1:
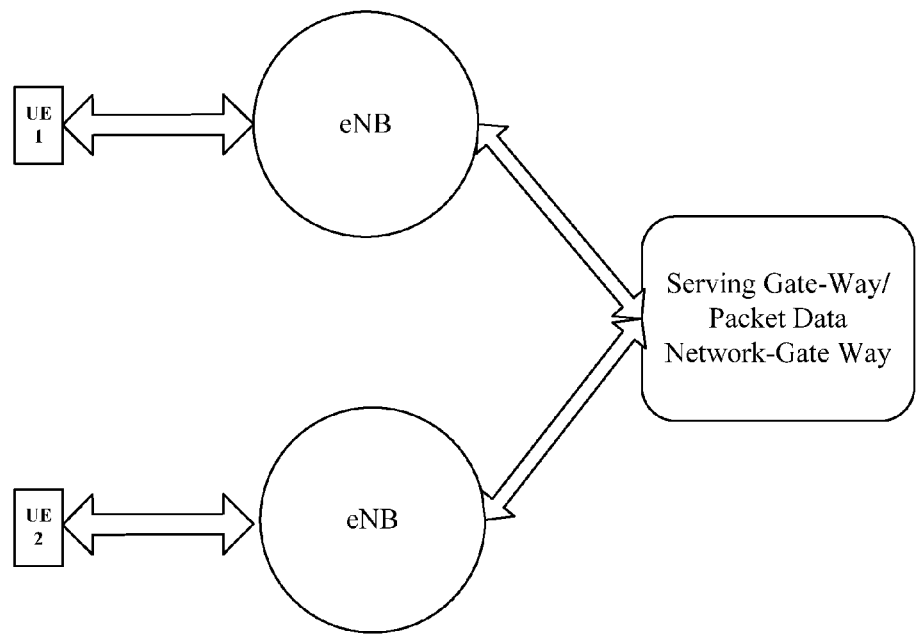
FIG. 1 is a schematic view showing a data path for the communication between devices in the related art.
Figure 2A:
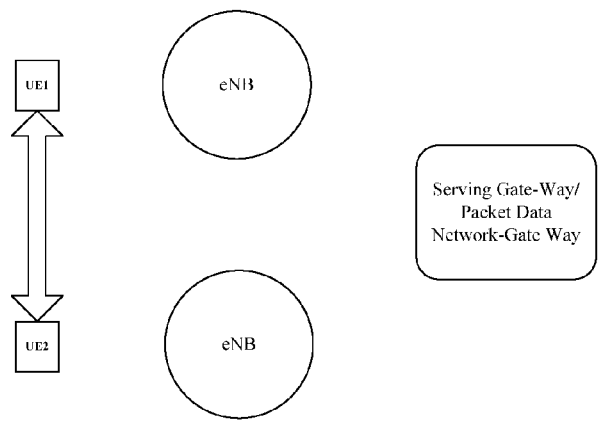
FIGS. 2a and 2b are schematic views showing paths for proximity communication in the related art.
Figure 2B:
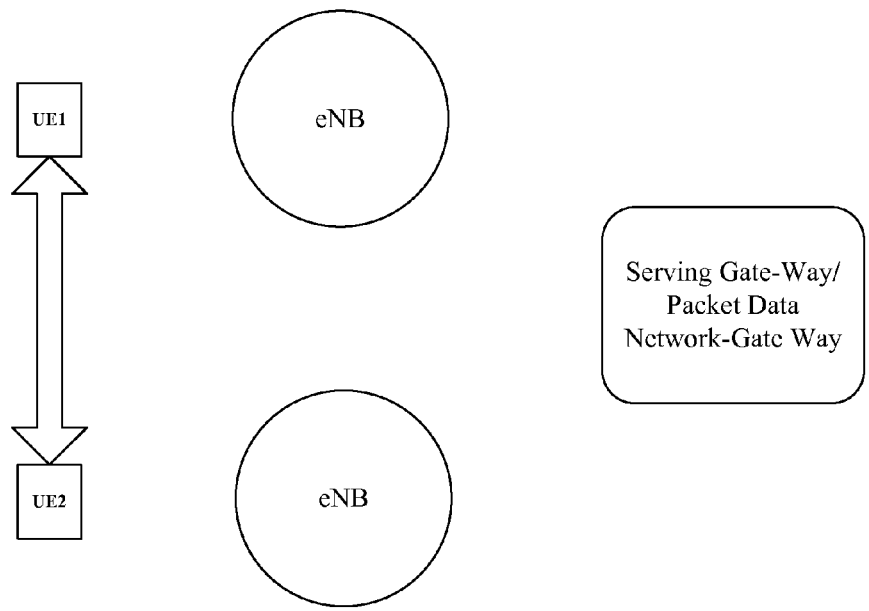
Figure 3:
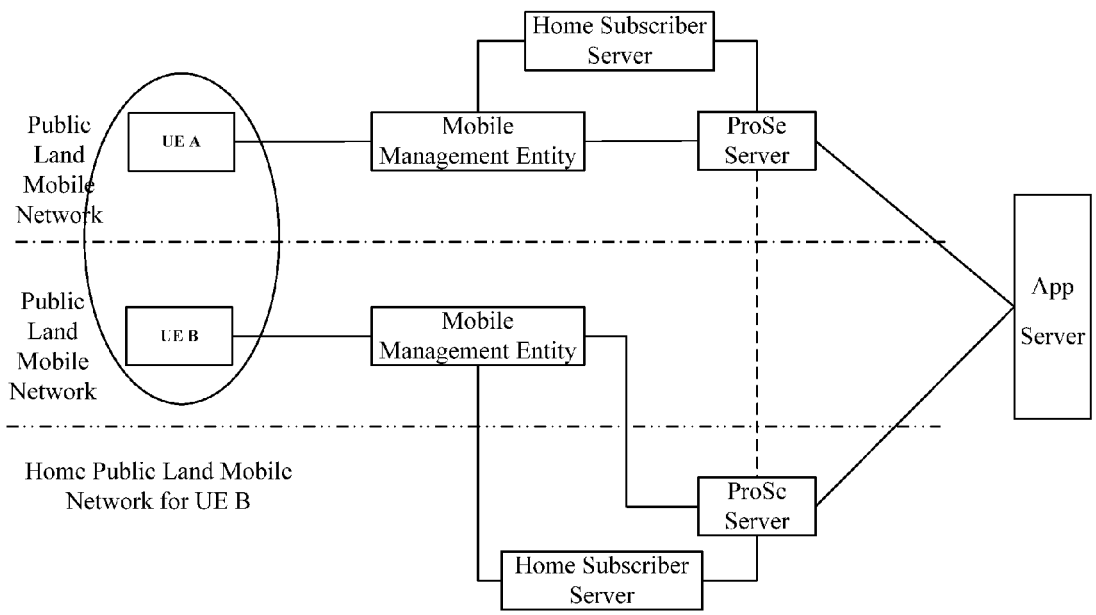
FIG. 3 is a schematic view showing proximity communication architecture according to one embodiment of the present disclosure.

As shown in FIG. 3, in order to acquire mapping relationships between a UE's 3GPP network layer identifier and a UE's application layer identifier, the proximity communication service is regarded as a service provided by a 3GPP network. A terminal (i.e., UE) is identified by this service using a proximity communication service identifier bound to a Subscriber Identity Module (SIM)/Universal Subscriber identity Module (USIM). The proximity communication service identifier may be a Mobile Subscriber Integrated Services Digital Network Number (NSISDN), an External ID, or a newly-assigned identifier for identifying the proximity communication service. Similar to the architecture of Machine-Type Communications (MTCs), a proximity communication service server connected to an application server is provided in the 3GPP network, so as to shield the topology and connection relationships of the 3GPP network with respect to the application server. The proximity communication service server is merely located at a Home Public Land Mobile Network (HPLMN), and there is an interface between it and the application layer. In addition, the proximity communication service server is also interfaced with a Home Subscriber Server (HSS) and an MME. A proximity communication service node mainly has the following functions.

1. It may inquire from the HSS a UE internal identifier and acquire subscription information related to the proximity communication in accordance with the proximity communication service identifier. 2. It may receive a request for the proximity communication service from the application server and return a proximity communication service state. 3. It may authenticate whether or not the application server is allowed to initiate the proximity communication service. 4. It may store position information and the proximity communication service identifier of a terminal. 5. It may determine whether or not the proximity communication service, including the discovery of a proximal terminal and the proximal communication connection, can be established. 6. It may generate billing data in accordance with the proximity communication service.

Figure 4:
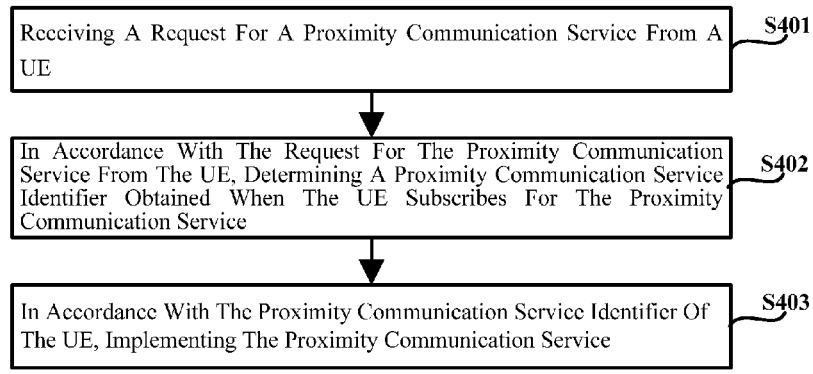
FIG. 4 is a flow chart of a method for implementing a proximity communication service according to one embodiment of the present disclosure.

As shown in FIG. 4, the present disclosure provides in one embodiment a method for implementing a proximity communication service, which includes:

Step S401 of receiving a request for a proximity communication service from a UE:

Step S402 of, in accordance with the request for the proximity communication service from the UE, determining a proximity communication service identifier obtained when the UE subscribes for the proximity communication service, and Step S403 of, in accordance with the proximity communication service identifier of the UE, implementing the proximity communication service.

When the proximity communication service identifier is carried in the request for the proximity communication service from the UE, the proximity communication service identifier may be determined directly from the request for the proximity communication service. When merely an application layer user identifier is carried in the request for the proximity communication service from the UE, it is required to determine the proximity communication service identifier obtained when the UE subscribes for the proximity communication service in accordance with the application layer user identifier carried in the request for the proximity communication service from the UE as well as a correspondence between the application layer user identifier and the proximity communication service identifier.

Hence, the Step S402 of, in accordance with the request for the proximity communication service from the UE, determining the proximity communication service identifier obtained when the UE subscribes for the proximity communication service includes:

acquiring the proximity communication service identifier carried in the required for the proximity communication service from the UE; or in accordance with the application layer user identifier carried in the request for the proximity communication from the UE, determining the proximity communication service identifier obtained when the UE subscribes for the proximity communication service.

During the implementation, when the user subscribes for the proximity communication service with the service provider, the service provider may provide the proximity communication service identifier, i.e., ProSe ID, to the user. This identifier may be a mobile phone number, an external identifier of a terminal, or a new identifier assigned by a proximity communication service server. In addition, a mapping relationship between the proximity communication service identifier of the terminal and the International Mobile Subscriber Identification Number (IMSI) as well as the subscription information related to the proximity communication service, e.g., a search range and whether or not the terminal is allowed to be discovered, may be stored in the HSS. When the UE logs in the application server and both the terminal and the application support the proximity communication service, the UE may provide both the ProSe ID and a User ID at the application layer so as to log in the application. When the proximity communication service is directly used by the user, the proximity communication service may be established by the terminal and the network using the ProSe ID. When a specific application at the application layer is used by the user, the application server may, based on an application layer request from the user or the server's own judgment, request a ProSe Server to establish the proximity communication service for the user. At this time, the application server needs to index the ProSe ID in accordance with the User ID, and select an appropriate ProSe Server in accordance with the ProSe ID, so as to implement the proximity communication service.

The proximity communication service identifier obtained when the UE subscribes for the proximity communication service may be bound to, and stored in, the UE's subscription information.

The user may send the request for the proximity communication service to a network side through the application, or directly. When the user sends the request for the proximity communication service through the application, the request for the proximity communication service is processed by the application server, and when the user sends the request for the proximity communication service to the network side directly, the request for the proximity communication service is processed by the proximity communication service server.

When the user sends the request for the proximity communication service through an application, the Step S401 of receiving the request for the proximity communication service from the UE includes receiving, by the application server, the request for the proximity communication service from the UE through the application, and Step S403 of, in accordance with the proximity communication service identifier of the UE, implementing the proximity communication service includes selecting, by the application server, a corresponding proximity communication service server in accordance with the proximity communication service identifier of the UE so as to implement the UE's proximity communication service.

To be specific, when the user sends a request for searching a proximal user through an application, the step of receiving, by the application server, the request for the proximity communication service from the UE through the application includes receiving, by the application server, the request for searching the proximal user from the UE through the application. The step of, in accordance with the proximity communication service identifier of the UE, implementing the proximity communication service includes:

searching, by the application server, users within a predetermined search range in accordance with a UE's position or an IP address, and determining a user identifier of each searched user, or determining, by the application server, the user identifier of each searched user in accordance with the received request for searching the proximal user;

determining, by the application server, a proximity communication service identifier of the searched user in accordance with the user identifier;

determining, by the application server, a proximity communication service server of the UE in accordance with the proximity communication service identifier of the UE, and determining that the UE has the privilege to search the proximal user through the proximity communication service server of the UE, searching a corresponding proximity communication service server in accordance with the proximity communication service identifier of each searched user through the proximity communication service server of the UE, sending a discovery request to these corresponding proximity communication service servers, receiving a discovery result returned by the proximity communication service server of the UE after receiving a corresponding user's position information returned by each of the proximity communication service servers after it determines that the corresponding user is allowed to be discovered; and sending, by the application server, the discovery result to the UE.

When the user sends a request for establishing the proximity communication service through an application, the step of receiving, by the application server, the request for the proximity communication service from the UE through an application includes receiving, by the application server, the request for establishing the proximity communication service from the UE through the application. The step of, in accordance with the proximity communication service identifier of the UE, implementing the proximity communication service includes: determining, by the application server, a corresponding proximity communication service identifier in accordance with a user identifier of a target UE;

determining, by the application server, a proximity communication service server of the UE in accordance with the proximity communication service identifier of the UE, sending a connectivity request for the proximity communication service to the proximity communication service server of the UE, requesting, by the proximity communication service server of the UE a network to assign resources desired for the establishment of the proximity communication connection for the UE and the target UE after the proximity communication service server of the UE determines that a condition for establishing the proximity communication connection between the UE and the target UE is met, and establishing the proximity communication connection;

receiving, by the application server, a message about the successful establishment of the proximity communication connection returned by the proximity communication service server of the UE; and returning, by the application server, the message about the successful establishment of the proximity communication connection to the UE.

The step of determining, by the proximity communication service server of the UE, that the condition for establishing the proximity communication connection between the UE and the target UE is met includes:

determining, by the proximity communication service server of the UE, that the proximity communication connection has been established between the UE and the target UE; or after the proximity communication service server of the UE determines that the UE has the privilege to establish the proximity communication service, searching a corresponding proximity communication service server in accordance with a proximity communication service identifier of the target UE, sending a discovery request to the corresponding proximity communication service server, returning position information about the target UE to the proximity communication service server of the UE after the proximity communication service server of the target UE determines that the target UE has the privilege to establish the proximity communication service, and determining, by the proximity communication service server of the UE, that the proximity communication connection can be established between the UE and the target UE in accordance with subscription information and position information about the proximity communication service of the UE, and position information about the target UE.

The step of requesting, by the proximity communication service server of the UE, the network to assign the resources desired for the establishment of the proximity communication connection for the UE and the target UE and establishing the proximity communication connection includes:

sending, by the proximity communication service server of the UE, the connectivity request for the proximity communication service to the MME to which the UE belongs, requesting, by the MME to which the UE belongs, the network to assign the resources desired for the proximity communication connection for the UE and returning information assigned for the UE and desired for the establishment of the proximity communication connection to the proximity communication service server of the UE, sending, by the proximity communication service server of the UE, the connectivity request for the proximity communication service carrying the information to the proximity communication service server of the target UE, requesting, by the proximity communication service server of the target UE, the network to assign the resources desired for the establishment of the proximity communication connection for the target UE, and establishing the proximity communication connection.

When the user sends the request for the proximity communication service directly to the network side, Step S401 of receiving the request for the proximity communication service from the UE includes receiving, by the proximity communication service server, the request for the proximity communication service from the UE, or receiving, by the proximity communication service server, the request for the proximity communication service forwarded by the MME after it receives the request for the proximity communication service from the UE.

Step S403 of, in accordance with the proximity communication service identifier of the UE, implementing the proximity communication service includes implementing, by the proximity communication service server, the proximity communication service of the UE in accordance with the proximity communication service identifier of the UE.

To be specific, when the user sends a search request directly to the network side and the proximity communication service identifier of the target UE is carried in the search request, the step of receiving, by the proximity communication service server, the request for the proximity communication service from the UE includes receiving, by the proximity communication service server, a search request from the UE, the proximity communication service identifier of the UE, the proximity communication service identifier of the target UE and an application identifier for triggering the search being carried in the search request.

The step of implementing, by the proximity communication service server, the proximity communication service of the UE in accordance with the proximity communication service identifier of the UE includes: after the proximity communication service server determines that the application is allowed to use the proximity communication service in accordance with the application identifier, sending by the proximity communication service server, the search request to a proximity communication service server of the target UE, and receiving, by the proximity communication service server of the UE, a current position of the target UE returned by the proximity communication service server of the target UE after it determines that the target UE is allowed to be discovered in accordance with the proximity communication service identifier of the target UE; and returning, by the proximity communication service server, a discovery result to the UE after determining whether or not the target UE can be discovered in accordance with positions of the two terminals.

When the user sends the search request directly to the network side and the application layer user identifier of the target UE is carried in the search request, the step of receiving, by the proximity communication service server, the request for the proximity communication service directly from the UE includes: receiving, by the proximity communication service server, the search request from the UE, the proximity communication service identifier of the UE, the application layer user identifier of the target UE and the application identifier for triggering the search being carried in the search request.

The step of implementing, by the proximity communication service server, the proximity communication service of the UE in accordance with the proximity communication service identifier of the UE includes:

inquiring. by the proximity communication service server, a Domain Name Service (DNS) Server in accordance with the application layer user identifier of the target UE, or acquiring the proximity communication service identifier of the target UE in accordance with an application server identified with the application identifier;

sending the search request to the proximity communication service server of the target UE, by the proximity communication service server, after determining that the application is allowed to use the proximity communication service in accordance with the application identifier, and receiving, by the proximity communication service server of the UE, a current position of the target UE returned by the proximity communication service server of the target UE after it determines that the target UE is allowed to be discovered in accordance with the proximity communication service identifier of the target UE; and returning, by the proximity communication service server, a discovery result to the UE after determining whether or not the target UE can be discovered in accordance with positions of the two terminals.

When the user sends the request for establishing the proximity communication service directly to the network side, the step of receiving, by the proximity communication service server, the request for the proximity communication service from the UE includes receiving, by the proximity communication service server, the request for establishing the proximity communication service directly from the UE, the proximity communication service identifier of the UE, the proximity communication service identifier of the target UE and the application identifier for triggering the establishment of the proximity communication service being carried in the request for establishing the proximity communication service.

The step of implementing, by the proximity communication service server, the proximity communication service of the UE in accordance with the proximity communication service identifier of the UE includes:

sending, by the proximity communication service server, the request for establishing the proximity communication service to the proximity communication service server of the target UE, and receiving, by the proximity communication service server of the UE, a current position of the target UE returned by the proximity communication service server of the target UE after it determines that the target UE is allowed to establish the proximity communication connection;

after the proximity communication service server determines that a condition for establishing the proximity communication connection between the UE and the target UE is met, requesting, by the proximity communication service server of the UE, the network to assign the resources desired for establishing the proximity communication connection for the UE and the target UE, and establishing the proximity communication connection; and returning. by the proximity communication service server, a message about the successful establishment of the proximity communication connection to the UE.

The step of receiving, by the proximity communication service server, the request for the proximity communication service directly from the UE includes receiving, by the proximity communication service server, the request for establishing the proximity communication service from the UE, the proximity communication service identifier of the UE, the application layer user identifier of the target UE and the application layer identifier for triggering the establishment of the proximity communication service being carried in the request.

The step of implementing, by the proximity communication service server, the proximity communication service of the UE in accordance with the proximity communication service identifier of the UE includes:

inquiring, by the proximity communication service server, the DNS Server in accordance with the application layer user identifier of the target UE, or acquiring the proximity communication service identifier of the target UE in accordance with the application server identified with the application identifier;

sending, by the proximity communication service server, the request for establishing the proximity communication service to the proximity communication service server of the target UE, and receiving, by the proximity communication service server of the UE, the current position of the target UE returned by the proximity communication service server of the target UE after it determines that the target UE is allowed to establish the proximity communication connection;

after the proximity communication service server determines that a condition for establishing the proximity communication connection between the UE and the target UE is met, requesting, by the proximity communication service server of the UE, the network to assign the resources desired for establishing the proximity communication connection for the UE and the target UE, and establishing the proximity communication connection; and returning. by the proximity communication service server, a message about the successful establishment of the proximity communication connection to the UE.

The step of determining, by the proximity communication service server, that the condition for establishing the proximity communication connection between the UE and the target UE is met includes:

determining. by the proximity communication service server, that the proximity communication connection has been established between the UE and the target UE; or after the proximity communication service server determines that the UE has the privilege to establish the proximity communication service, searching a corresponding proximity communication service server in accordance with the proximity communication service identifier of the target UE, sending a discovery request to the proximity communication service server, receiving position information about the target UE returned after the proximity communication service server of the target UE determines that the target UE has the privilege to establish the proximity communication service, and determining, by the proximity communication service server, that the proximity communication connection can be established between the UE and the target UE in accordance with subscription information about the proximity communication service and position information of the UE, and position information about the target UE.

The step of requesting, by the proximity communication service server, the network to assign the resources desired for establishing the proximity communication connection for the UE and the target UE and establishing the proximity communication connection includes: sending, by the proximity communication service, the connectivity request for the proximity communication service to the MME to which the UE belongs after determining that the proximity communication connection can be established, requesting, by the MME to which the UE belongs, the network to assign the resources desired for establishing the proximity communication connection for the UE, and returning information desired for establishing the proximity communication connection to the proximity communication service server of the UE; and sending, by the proximity communication service server, the connectivity request for the proximity communication service carrying the information assigned for the UE and desired for establishing the proximity communication connection to the proximity communication service server of the target UE, requesting, by the proximity communication service server of the target UE, the network to assign the resources desired for establishing the proximity communication connection for the target UE, and establishing the proximity communication connection.

The method for implementing the proximity communication service will be described hereinafter in conjunction with die embodiments.

First Embodiment

Figure 5:
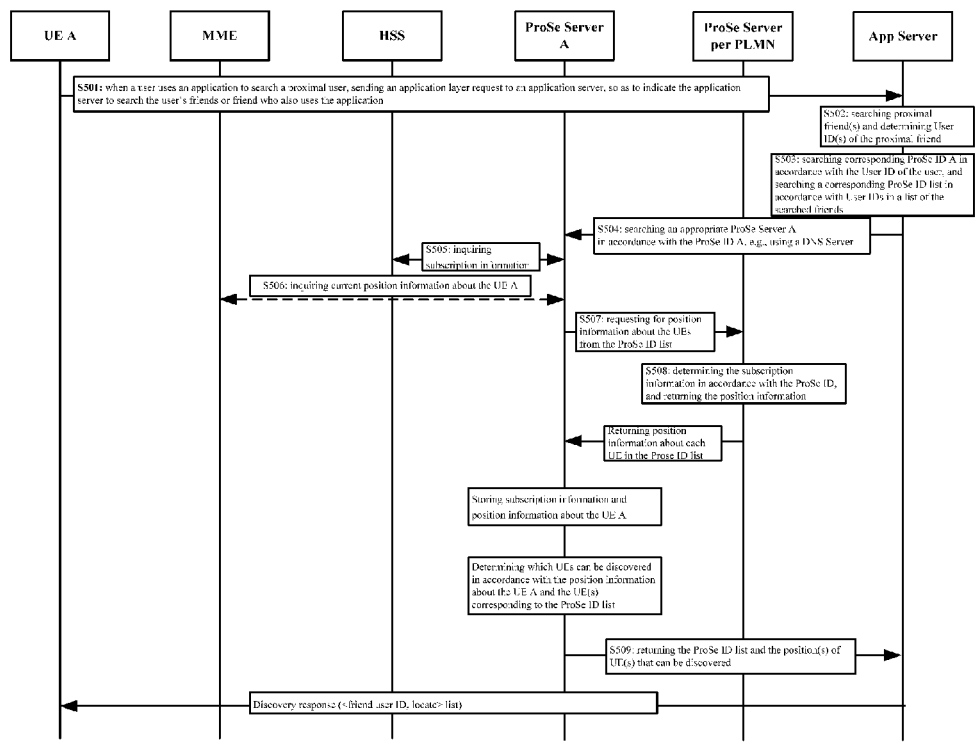
FIG. 5 is a flow chart of the method for implementing the proximity communication service according to the first embodiment of the present disclosure.

In this embodiment, a proximal user is searched when a proximity communication service (ProSe) discovery process is triggered by an application on a terminal. As shown in FIG. 5, the method includes the following steps.

Step S501: when a user uses an application to search a proximal user, sending, by a UE, an application layer request to an application server, so as to indicate the application server to search the user's friends or friend who also uses the application.

Step S502: searching, by the application server, the proximal friend(s) in accordance with such information as a current position of the terminal or an IP address within a search range indicated by a ProSe Server or the user or pre-configured by the server, so as to determine a User ID of the proximal friend.

Step S503: searching, by the application server, a corresponding ProSe ID A in accordance with the User ID of the user, and searching a corresponding ProSe ID list in accordance with User IDs in a list of the searched friends.

Step S504: searching, by the application server, an appropriate ProSe Server A in accordance with the ProSe ID A, e.g., using a DNS Server.

Step S505: sending, by the application server, a ProSe discovery request to the ProSe Server A so as to request the ProSe Server to inquire subscription information about the ProSe ID about the proximity communication service.

Step S506: inquiring, by the ProSe Server A, an HSS in accordance with the ProSe ID A, so as to acquire an IMSI and the subscription information about the proximity communication service of the UE, e.g., whether or not the application is allowed to use the proximity communication service, a search range, whether or not the user is allowed to be searched, and whether or not it needs to be acknowledged by the searched user. In addition, the ProSe Server A may request the network to acquire a current position of the UE.

Step S507: searching, by the ProSe Server A, corresponding ProSe Servers in accordance with the ProSe ID list, and sending a discovery request to these ProSe Servers.

Step S508: inquiring, by each ProSe Server, the HSS in accordance with the ProSe ID so as to acquire the subscription information about the proximity communication service of the UE, determining whether or not the UE is allowed to be discovered in accordance with the subscription information, and if yes, returning the current position information about the UE to the ProSe Server A.

Step S509: determining, by the ProSe Server A, which UEs in the ProSe ID list can be discovered by the user corresponding to the ProSe ID A in accordance with the subscription information about the proximity communication service of the UE corresponding to the ProSe ID A, the position information about the UE, and position information about the UEs in the ProSe ID list acquired from each ProSe Server, and returning a discovery result to the application server.

The subscription information about the proximity communication service of the UEs from the HSS may be cached in each ProSe Server, so that it is helpful for a corresponding UE acquire the subscription information about the proximity communication service when it sends the request for the proximity communication service again.

Second Embodiment

Figure 6:
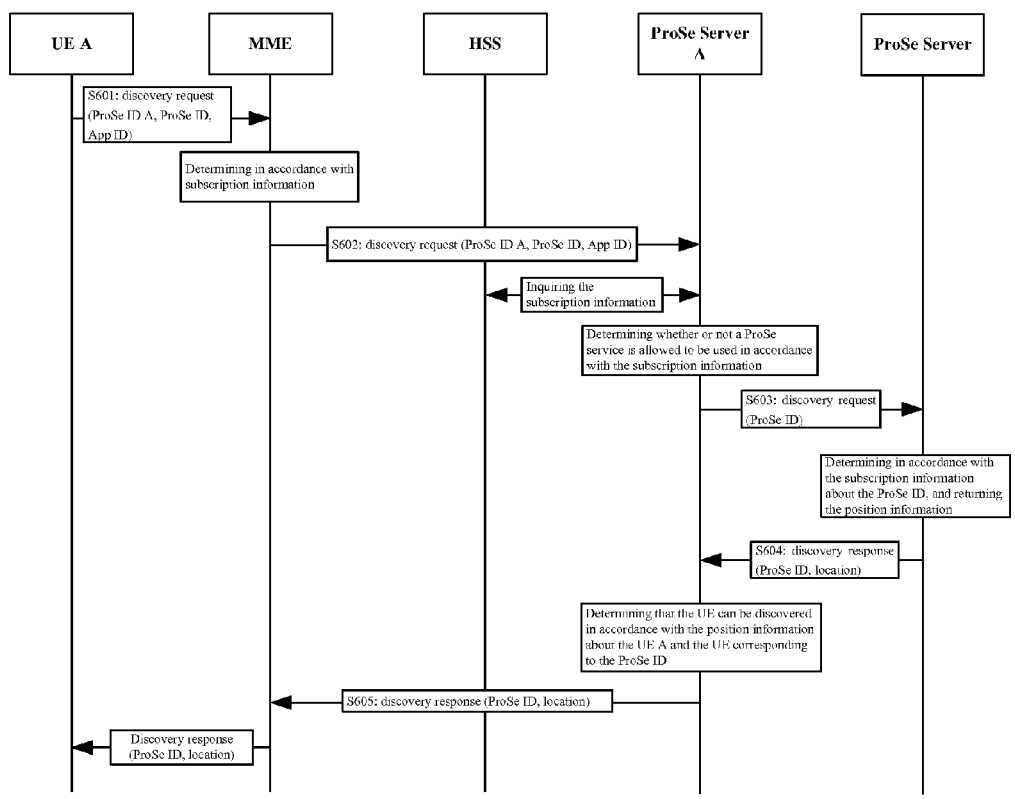
FIG. 6 is another flow chart of the method for implementing the proximity communication service according to the second embodiment of the present disclosure.

In this embodiment, the ProSe discovery process is performed by the terminal using the ProSe ID. As shown in FIG. 6, the method includes the following steps.

Step S601: searching a target user in accordance with a ProSe ID of the target user provided by the user, and sending, by the UE, a discovery request carrying ProSe IDs of a source terminal and a destination terminal and an application ID for triggering the search on the terminal to the network. The ProSe ID of the target user may be obtained by inquiring it from a DNS server using the application layer user ID of the target user.

Step S602: after an MME in the network receives the discovery request, acquiring subscription information about the UE in accordance with the ProSe ID of the source terminal carried in the request, determining whether or not the UE is allowed to use the proximity communication service in accordance with the subscription information, and if yes, forwarding the discovery request to the ProSe server. During the actual operation, the discovery request may not be forwarded by the MME, and instead, the subscription information about the UE may be verified directly after the discovery request is received by the ProSe Server.

Step S603: determining, by the ProSe Server, whether or not the application is allowed to use the proximity communication service in accordance with the Application ID, and if yes, sending a request to the ProSe Server of the destination terminal.

Step S604: inquiring, by the ProSe Server of the destination terminal, the subscription information about the UE in accordance with the ProSe ID, determining whether or not the UE is allowed to be discovered in accordance with the subscription information, and if yes, returning a current position of the UE to the ProSe Server of the source terminal.

Step S605: determining, by the ProSe Server of the source terminal, whether or not the UE can be discovered in accordance with the positions of the two terminals, and returning a discovery result.

Third Embodiment

Figure 7:
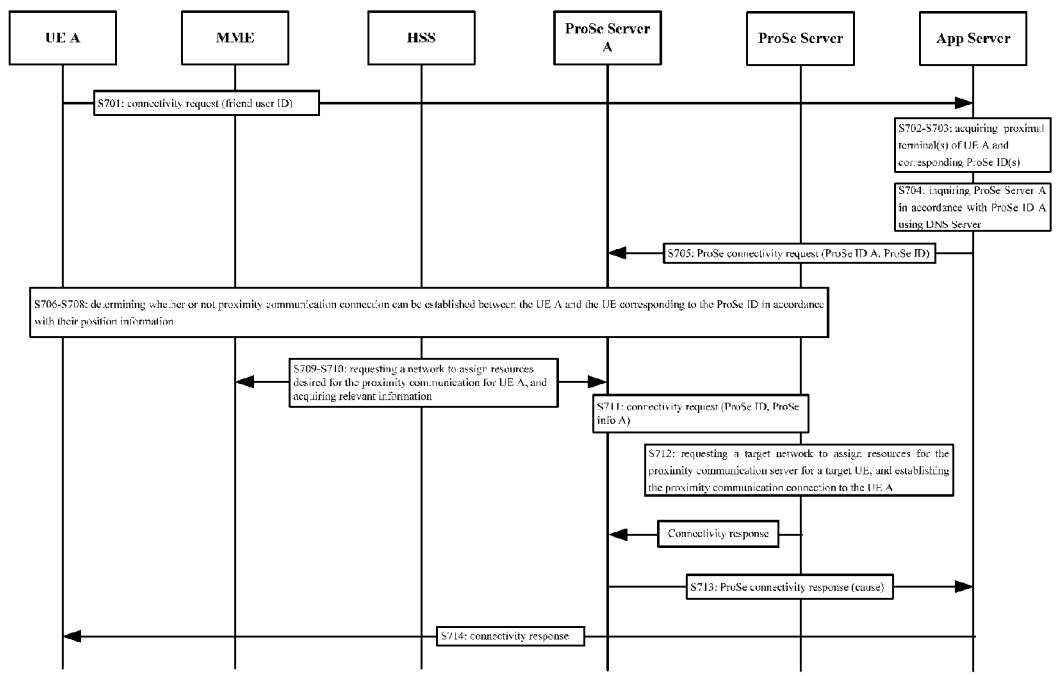
FIG. 7 is yet another flow chart of the method for implementing the proximity communication service according to the third embodiment of the present disclosure.

In this embodiment, the establishment of the ProSe connection is triggered by an application on the terminal. As shown in FIG. 7, the method includes the following steps.

Step S701: triggering, by an application on the terminal, the establishment of the proximity communication connection to a proximal user, and sending, by the UE, an application layer request to an application server.

Step S702: inquiring, by an application server, a current position or an IP address of the terminal in accordance with a User ID of the terminal in the request, and determining whether or not the proximity communication connection can be established between the two terminals.

Step S703: searching, by the application server, a corresponding ProSe ID A in accordance with a User ID of a source terminal, and searching a corresponding ProSe ID in accordance with a User ID of a destination terminal.

Step S704: searching, by the application server, an appropriate ProSe Server A in accordance with the ProSe ID A, e.g., using a DNS Server.

Step S705: sending, by the application server, a ProSe connectivity request to the ProSe Server A, so as to request the ProSe Server to establish the proximity communication connection between the ProSe ID A and the ProSe ID.

Step S706: inquiring, by the ProSe Server A, an HSS in accordance with the ProSe ID A so as to acquire an IMSI and subscription information about the proximity communication service of the UE, e.g., whether or not the application is allowed to use the proximity communication service, and a proximity communication range. In addition, the ProSe Server A may request the network to acquire a current position of the UE.

Step S707: searching, by the ProSe Server A, a corresponding ProSe Server in accordance with the ProSe ID, and sending a discovery request to the ProSe Server.

Step S708: inquiring, by the ProSe Server, the HSS in accordance with the ProSe ID so as to acquire the subscription information about the proximity communication service of the UE, determining whether or not the UE is allowed to establish the proximity communication connection in accordance with the subscription information, and if yes, returning the current position information about the UE to the ProSe Server A.

Step S709: determining, by the ProSe Server A, where or not the proximity communication connection can be established between UEs corresponding to the ProSe ID A and the ProSe ID, respectively, in accordance with the subscription information about the proximity communication service of the UE corresponding to the ProSe ID A, the position information about the UE corresponding to the ProSe ID A. and the position information about the UE corresponding to the ProSe ID, and if yes, sending, by the ProSe Server A, the ProSe connectivity request to an MME A.

Step S710: after receiving the ProSe connectivity request, requesting, by the MME A, the network to assign resources desired for establishing the proximity communication connection for UE A, and returning information assigned for the UE A and desired for establishing the proximity communication connection to the ProSe Server A.

Step S711: sending, by the ProSe Server A, the ProSe connectivity request carrying the information assigned for the UE A and desired for establishing the proximity communication connection to the ProSe Server.

Step S712: requesting, by the ProSe Server, the network to assign the resources desired for establishing the proximity communication connection for the UE corresponding to the ProSe ID, and establishing the proximity communication connection.

Step S713: returning, by the ProSe Server A, a message about the successful establishment of the proximity communication connection to the application server.

Step S714: returning, by the application server, the message about the successful establishment of the proximity communication connection to the terminal.

A ProSe ID A and ProSe ID pair. <ProSe ID A. ProSe ID>, are stored in both the ProSe Server A and the ProSe Server, which means that the proximity communication connection has been established therebetween. When a request for establishing the proximity communication connection therebetween is received subsequently, it is unnecessary to perform the determination any more, and the proximity communication connection may be established directly.

Fourth Embodiment

Figure 8:
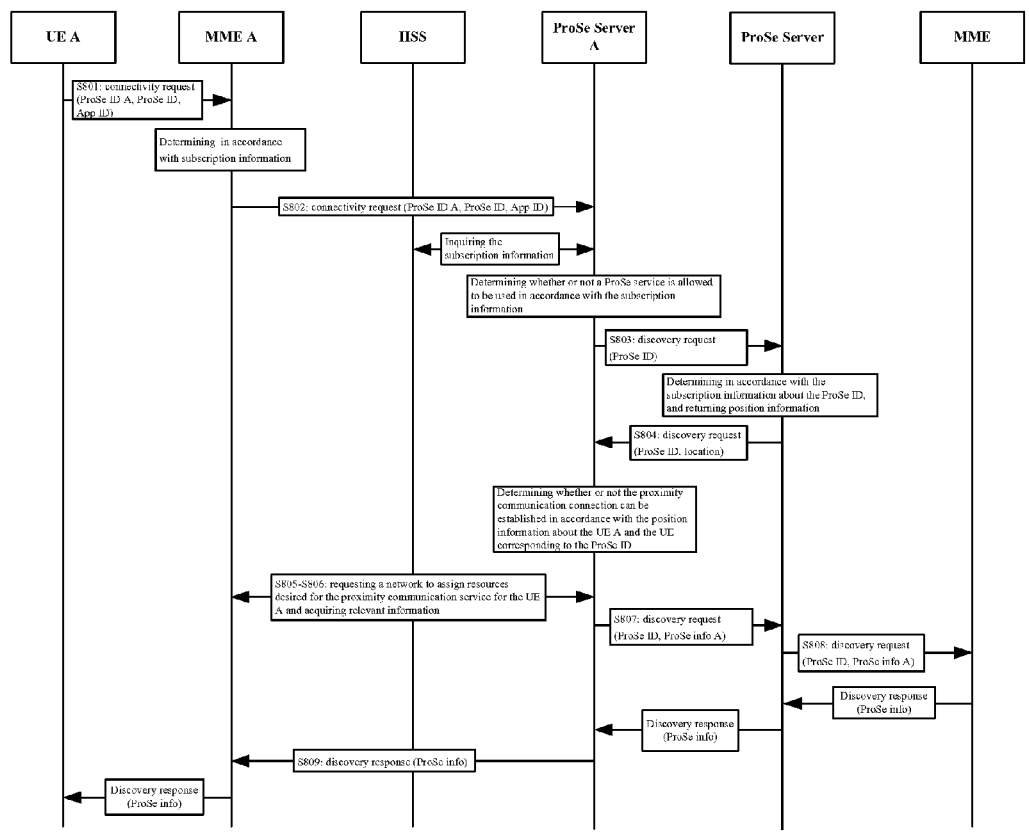
FIG. 8 is still yet another flow chart of the method for implementing the proximity communication service according to the fourth embodiment of the present disclosure.

In this embodiment, the proximity communication connection is established by the terminal using a ProSe ID. As shown in FIG. 8, the method includes the following steps.

Step S801: providing, by a user, a ProSe ID of a target user to establish the proximity communication connection, and sending a ProSe connectivity request carrying ProSe IDs of a source terminal and a destination terminal and an application ID on the terminal for triggering the proximity communication service to an MME A in a network. The ProSe ID of the target user may be obtained by inquiring a DNS server using an application layer User ID of the target user.

Step S802: after receiving the ProSe connectivity request, acquiring, by the MME A in the network, subscription information about a UE in accordance with the ProSe ID of the source terminal carried in the request, determining whether or not the terminal is allowed to use the proximity communication service in accordance with the subscription information, and if yes, forwarding the request to a ProSe Server A. During the actual operation, the ProSe connectivity request may not be forwarded by the MME A, and instead, the subscription information about the UE may be verified directly after the ProSe connectivity request is received by the ProSe Server A.

Step S803: determining, by the ProSe Server A, whether or not the application is allowed to use the proximity communication service in accordance with the application ID, and if yes, sending a request to a ProSe Server of the destination terminal.

Step S804: inquiring, by the ProSe Server of the destination terminal, the subscription information about the UE in accordance with the ProSe ID, determining whether or not the UE is allowed to establish the proximity communication connection in accordance with the subscription information, and if yes, returning a current position of the UE to the ProSe Server A of the source terminal.

Step S805: determining, by a ProSe Server A, whether or not the proximity communication connection can be established in accordance with the positions of the two terminals, and if yes, sending, by the ProSe Server A, the ProSe connectivity request to the MME A.

Step S806: after receiving the ProSe connectivity request, requesting, by the MME A, the network to assign resources desired for establishing the proximity communication connection for UE A, and returning information assigned for the UE A and desired for establishing the proximity communication connection to the ProSe Server A.

Step S807: sending, by the ProSe Server A, the ProSe connectivity request carrying the information assigned for the UE A and desired for establishing the proximity communication connection to the ProSe Server.

Step S808: requesting, by the ProSe Server, the network to assign resources desired for establishing the proximity communication connection for the UE corresponding to the ProSe ID, and establishing the proximity communication connection.

Step S809: returning, by the ProSe Server A, a message about the successful establishment of the proximity communication connection to the UE A.

A ProSe ID A and ProSe ID pair <ProSe ID A. ProSe ID> is stored in both the ProSe Server A and the ProSe Server, which means that the proximity communication connection has been established therebetween. When a request for establishing the proximity communication connection therebetween is received subsequently, it is unnecessary to perform the determination, and the proximity communication connection may be established directly.

Fifth Embodiment

Figure 9:
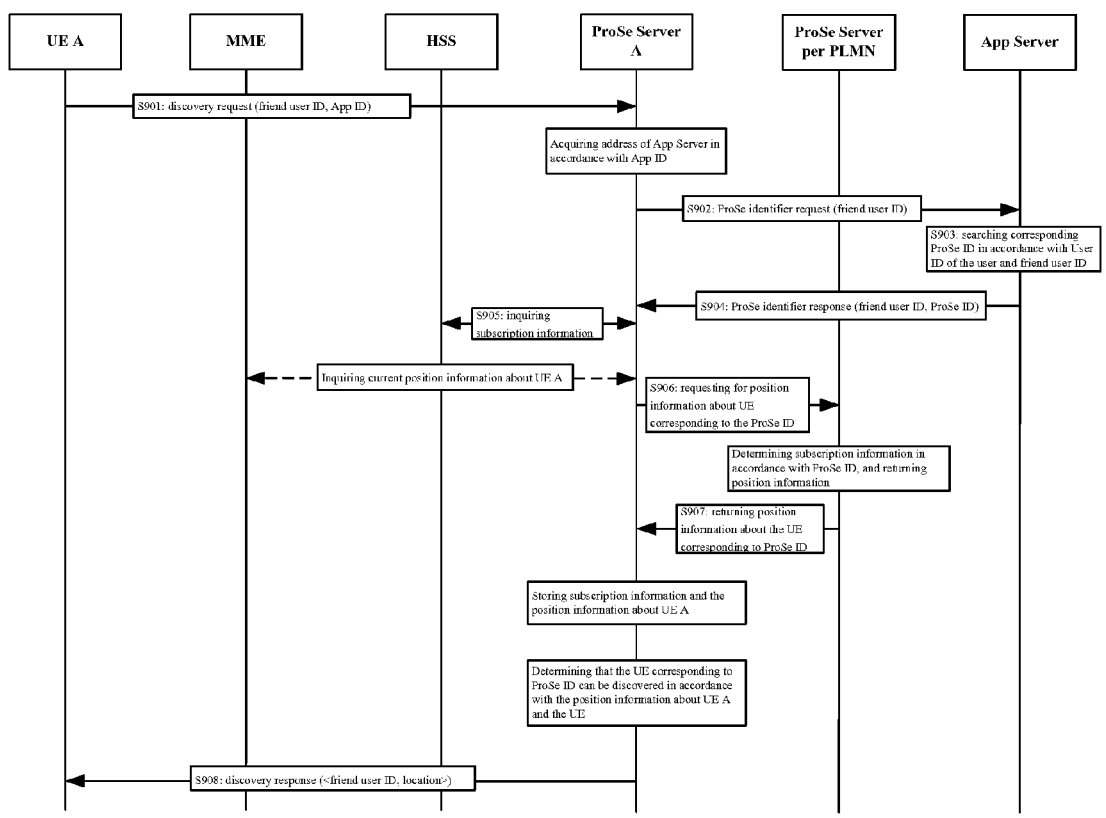
FIG. 9 is still yet another flow chart of the method for implementing the proximity communication service according to the fifth embodiment of the present disclosure.

In this embodiment, a proximal user may be searched by an application on the terminal using an application ID. As shown in FIG. 9, the method includes the following steps.

Step S901: when a user uses an application to search a proximal user, sending, by a UE, a search request to a ProSe Server A, so as to indicate the ProSe Server A to search a friend user ID on the application ID.

Step S902: acquiring, by the ProSe Server A, an IP address of an application server in accordance with the application ID provided by the current terminal, and sending a request for acquiring a ProSe ID corresponding to the friend user ID to the application server.

Step S903: searching, by the application server, a corresponding ProSe ID in accordance with a User ID of the user and the friend user ID.

Step S904: returning, by the application server, the ProSe ID corresponding to the friend user ID to the ProSe Server A.

Step S905: inquiring, by the ProSe Server A, an HSS in accordance with a ProSe ID A so as to acquire an IMSI and subscription information about the proximity communication service of the UE, e.g., whether or not the application is allowed to use the proximity communication service, a search range, whether or not the UE is allowed to be searched, and whether or not the proximity communication connection needs to be acknowledged by the searched user. In addition, the ProSe Server A may request the network to acquire a current position of the UE.

Step S906: searching, by the ProSe Server A, corresponding ProSe Servers in accordance with the ProSe Id, and sending a discovery request to these ProSe Servers.

Step S907: inquiring, by the ProSe Server, an HSS in accordance with the ProSe ID so as to acquire the subscription information about the proximity communication service of the UE, determining whether or not the UE is allowed to be discovered in accordance with the subscription information, and if yes, returning the current position information about the UE to the ProSe Server A.

Step S908: determining, by the ProSe Server A, whether or not the UE corresponding to the ProSe ID can be discovered by the user corresponding to the ProSe ID A in accordance with the subscription information about the proximity communication service of the UE corresponding to the ProSe ID A, the position information about the UE corresponding to the ProSe ID A, and the position information about the UE corresponding to the ProSe ID acquired from the ProSe Server, and returning a discovery result to the UE.

Sixth Embodiment

Figure 10:
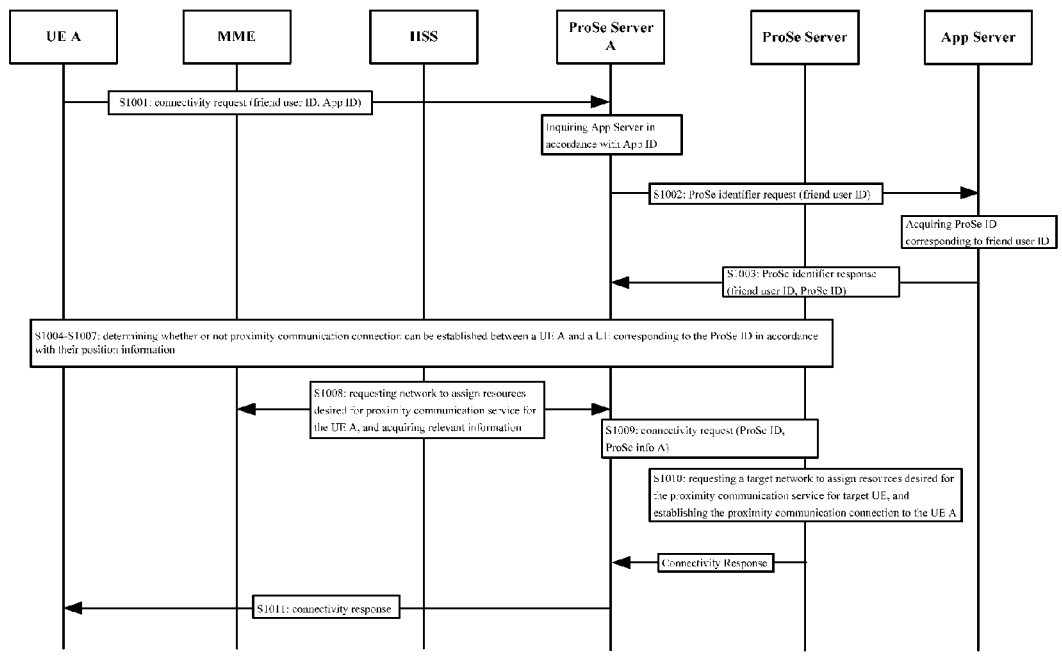
FIG. 10 is still yet another flow chart of the method for implementing the proximity communication service according to the sixth embodiment of the present disclosure.

In this embodiment, the proximity communication connection is established by an application on the terminal using an application ID. As shown in FIG. 10, the method includes the following steps.

Step S1001: triggering, by an application on the terminal, the establishment of the proximity communication connection to a proximal user, and sending, by a UE, a connectivity request for the proximity communication service to a ProSe Server A.

Step S1002: inquiring, by the ProSe Server A, an application server in accordance with an application ID of the terminal carried in the request, and sending a request for acquiring a ProSe ID to the application server.

Step S1003: searching, by the application server, a corresponding ProSe ID in accordance with a User ID of a destination terminal, and returning it to the ProSe Server A.

Step S1004: inquiring, by the ProSe Server A, an HSS in accordance with a ProSe ID A so as to acquire an IMSI and subscription information about the proximity communication service of the UE, e.g., whether or not the application is allowed to use the proximity communication service and a proximity communication range. In addition, the ProSe Server A may request a network to acquire a current position of the UE.

Step S1005: searching, by the ProSe Server A, a corresponding ProSe Server in accordance with the ProSe ID, and sending a discovery request to the ProSe Server.

Step S1006: inquiring, by the ProSe Server, an HSS in accordance with the ProSe ID so as to acquire the subscription information about the proximity communication service of the UE, determining whether or not the UE is allowed to establish the proximity communication connection in accordance with the subscription information, and if yes, returning the current position information about the UE to the ProSe Server A.

Step S1007: determining, by the ProSe Server A, whether or not the proximity communication connection can be established between UEs corresponding to the ProSe ID A and ProSe ID in accordance with the subscription information about the proximity communication service of the UE corresponding to the ProSe ID A, the position information about the UE corresponding to the ProSe ID A. and the position information about the UE corresponding to the ProSe ID, and if yes, sending, by the ProSe Server A, a ProSe connectivity request to the MME A.

Step S1008: after receiving the ProSe connectivity request, requesting, by the MME A, the network to assign resources desired for establishing the proximity communication connection for UE A, and returning information assigned for the UE A and desired for establishing the proximity communication connection to the ProSe Server A.

Step S1009: sending, by the ProSe Server A, the ProSe connectivity request carrying the information assigned for the UE A and desired for establishing the proximity communication connection to the ProSe Server.

Step S1010: requesting, by the ProSe Server, the network to assign the resources desired for establishing the proximity communication connection for the UE corresponding to the ProSe ID, and establishing the proximity communication connection.

Step S1011: returning, by the ProSe Server A, a message about the successful establishment of the proximity communication connection to the terminal.

A ProSe ID A and ProSe ID pair <ProSe ID A. ProSe ID> is stored in both the ProSe Server A and the ProSe Server, which means that the proximity communication connection has been established therebetween. When a request for establishing the proximity communication connection therebetween is received subsequently, it is unnecessary to perform the determination, and the proximity communication connection may be established directly.

Figure 11:
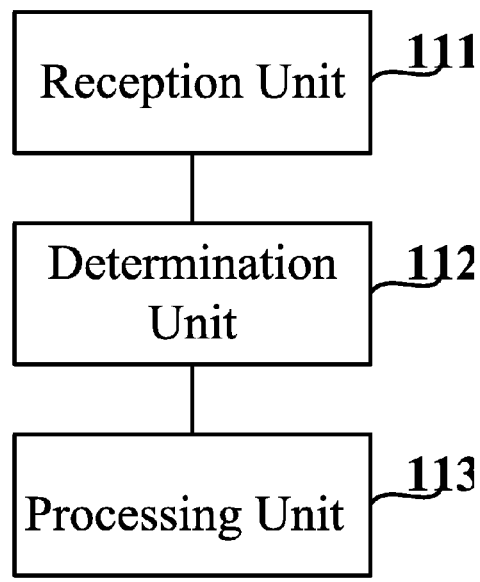
FIG. 11 is a schematic view showing a device for implementing a proximity communication service according to one embodiment of the present disclosure.

The present disclosure further provides in one embodiment a device for implementing a proximity communication service which, as shown include FIG. 11, includes: a reception unit 111 configured to receive a request for the proximity communication service from a UE:
 a determination unit 112 configured to determine a proximity communication service identifier obtained when the UE subscribes for the proximity communication service; and
 a processing unit 113 configured to, in accordance with the proximity communication service identifier of the UE, implement the proximity communication service.

The determination unit 112 is specifically configured to: acquire the proximity communication service identifier carried in the request for the proximity communication service from the UE; or determine the proximity communication service identifier obtained when the UE subscribes for the proximity communication service in accordance with an application layer user identifier carried in the request for the proximity communication service from the UE.

The proximity communication service identifier obtained when the UE subscribes for the proximity communication service is bound to, and stored in, subscription information about the UE.

When the device is an application server, the reception unit 111 is specifically configured to receive the request for the proximity communication service from the UE through an application. The processing unit 113 is specifically configured to, in accordance with the proximity communication service identifier of the UE, select a corresponding proximity communication service server to implement the proximity communication service of the UE.

The reception unit 111 is further configured to receive a request for searching a proximal user from the UE through an application. The processing unit 113 is further configured to: search a user within a predetermined range in accordance with a position of the UE or an IP address and determine a user identifier of the searched user, or determine the user identifier of the searched user in accordance with the received request for searching the proximal user; determine a proximity communication service identifier of the search user in accordance with the user identifier; determine a proximity communication service server of the UE in accordance with the proximity communication service identifier of the UE, determine whether or not the UE has the privilege to search the proximal user by the proximity communication service server of the UE, search corresponding proximity communication service servers by the proximity communication service server of the UE in accordance with the proximity communication service identifier of the searched user, send a discovery request to these proximity communication service servers, and receive a discovery result returned by the proximity communication service server of the UE after the proximity communication service servers determine that the corresponding user is allowed to be discovered and return the corresponding user's position information; and send the discovery result to the UE.

The reception unit 111 is further configured to receive a request for establishing the proximity communication service from the UE through an application. The processing unit 113 is further configured to: determine a corresponding proximity communication service identifier in accordance with a user identifier of a target UE; determine a proximity communication service server of the UE in accordance with the proximity communication service identifier of the UE, send a connectivity request for the proximity communication service to the proximity communication service server of the UE, and after the proximity communication service server of the UE determines that a condition for establishing the proximity communication connection between the UE and the target UE is met, request, by the proximity communication service server of the UE, a network to assign resources desired for establishing the proximity communication connection for the UE and the target UE, and establish the proximity communication connection; receive a message about the successful establishment of the proximity communication connection from the proximity communication service server of the UE; and return the message about the successful establishment of the proximity communication connection to the terminal.

When the device is a proximity communication service server, the reception unit 111 is specifically configured to receive the request for the proximity communication service from the UE, or receive the request for the proximity communication service forwarded by an MME after the MME receives the request for the proximity communication service from the UE. The processing unit 113 is specifically configured to implement the proximity communication service of the UE in accordance with the proximity communication service identifier of the UE. The reception unit 111 is further configured to receive from the UE the user search request carrying the proximity communication service identifier of the UE, the proximity communication service identifier of the target UE, and an application identifier for triggering the search. The processing unit 113 is specifically configured to, after it is determined that the application is allowed to use the proximity communication service in accordance with the application identifier, send the user search request to the proximity communication service server of the target UE, and receive, by the proximity communication service server of the UE, a current position of the target UE returned by the proximity communication service server of the target UE after it determines that the target UE is allowed to be discovered in accordance with the proximity communication service identifier of the target UE; and after it is determined whether or not the target UE can be discovered in accordance with the positions of the two terminals, return a discovery result to the UE.

The reception unit 111 is further configured to receive from the UE the user search request carrying the proximity communication service identifier of the UE, an application layer user identifier of the target UE, and the application identifier for triggering the search. The processing unit 113 is further configured to: inquire a DNS Server in accordance with the application layer user identifier of the target UE, or acquire the proximity communication service identifier of the target UE in accordance with the application server identified with the application identifier; and after it is determined that the application is allowed to use the proximity communication service in accordance with the application identifier, send the user search request to the proximity communication service server of the target UE, and receive, by the proximity communication service server of the UE, the current position of the target UE returned by the proximity communication service server of the target UE after it determines that the target UE is allowed to be discovered in accordance with the proximity communication service identifier of the target UE; and after it is determined whether or not the target UE can be discovered in accordance with the positions of the two terminals, and return a discovery result to the UE.

The reception unit 111 is further configured to receive a request for establishing the proximity communication service from the UE, the request carrying the proximity communication service identifier of the UE, the proximity communication service identifier of the target UE, and the application identifier for triggering the establishment of the proximity communication service. The processing unit 113 is further configured to: send the request for establishing the proximity communication service to the proximity communication service server of the target UE, and receive, by the proximity communication service server of the UE, the current position of the target UE returned by the proximity communication service server of the target UE after it determines that the target UE is allowed to establish the proximity communication connection; after it is determined that a condition for establishing the proximity communication connection between the UE and the target UE is met, request, by the proximity communication service server of the UE, the network to assign the resources desired for establishing the proximity communication connection for the UE and the target UE, and establish the proximity communication connection; and return a message about the successful establishment of the proximity communication connection to the UE.

The reception unit 111 is further configured to receive from the UE the request for establishing the proximity communication service, the request carrying the proximity communication service identifier of the UE, the application layer user identifier of the target UE, and the application identifier for triggering the establishment of the proximity communication service. The processing unit 113 is further configured to: inquire the DNS Server in accordance with the application layer user identifier of the target UE, or acquire the proximity communication service identifier of the target UE in accordance with the application server identified with the application identifier; send the request for establishing the proximity communication service to the proximity communication service server of the target UE, and receive, by the proximity communication service server of the UE, the current position of the target UE returned by the proximity communication service server of the target UE after it determines that the target UE is allowed to establish the proximity communication connection; after it is determined that a condition for establishing the proximity communication connection between the UE and the target UE is met, request, by the proximity communication service server of the UE, the network to assign the resources desired for establishing the proximity communication connection for the UE and the target UE, and establish the proximity communication connection; and return a message about the successful establishment of the proximity communication connection to the UE.

When determining that the condition for establishing the proximity communication connection between the UE and the target UE is met, the processing unit 13 is specifically configured to: determine that the proximity communication connection has been established between the UE and the target UE; or after determining that the UE has the privilege to establish the proximity communication service, search a corresponding proximity communication service server in accordance with the proximity communication service identifier of the target UE, send a discovery request to the proximity communication service server, receive the position information about the target UE returned by the proximity communication service server of the target UE after it determines that the target UE has the privilege to establish the proximity communication service, and determine that the proximity communication connection can be established between the UE and the target UE in accordance with the subscription information about the proximity communication service of the UE, the position information about the UE, and the position information about the target UE.

When requesting the network to assign the resources desired for establishing the proximity communication connection for the UE and the target UE and establishing the proximity communication connection, the processing unit 113 is specifically configured to: after it is determined that the UE is allowed to establish the proximity communication connection, send a connectivity request for the proximity communication service to an MME of the UE, request, by the MME of the UE, the network to assign the resources desired for establishing the proximity communication connection for the UE, and return the information desired for establishing the proximity communication connection; and send the connectivity request carrying the information assigned for the UE and desired for establishing the proximity communication connection to the proximity communication service server of the target UE, request, by the proximity communication service server of the target UE, the network to assign the resources desired for establishing the proximity communication connection for the target UE, and establish the proximity communication connection.

Figure 12:
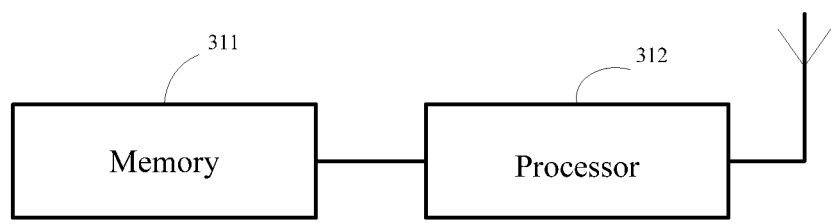
FIG. 12 is another schematic view showing the device for implementing the proximity communication service according to one embodiment of the present disclosure.

Referring to FIG. 12, the present disclosure provides in one embodiment another device for implementing a proximity communication service, which includes a memory 311 and a processor 312. The processor 312 is configured with a computer program capable of executing the above-mentioned method, so as to achieve the corresponding functions as well as the resultant advantageous effects. The memory 311 is configured to store codes of the computer program, and may be used to configure the processor 312. The processor 312 may, in accordance with the practical need, include a baseband processing part and a radio frequency processing part, so as to transmit the relevant information.

To be specific, the processor 312 is configured to receive the request for the proximity communication service from the UE, determine the proximity communication service identifier obtained when the UE subscribes for the proximity communication service, and implement the proximity communication service in accordance with the proximity communication service identifier of the UE. The processor 312 may acquire the proximity communication service identifier carried in the request for the proximity communication service from the UE, or determine the proximity communication service identifier obtained when the UE subscribes for the proximity communication service in accordance with the application layer user identifier carried in the request for the proximity communication service from the UE.

The proximity communication service identifier obtained when the UE subscribes for the proximity communication service is bound to, and stored in, the subscription information about the UE.

When the device is an application server, the processor 312 receives the request for the proximity communication service from the UE through an application, and select, in accordance with the proximity communication service identifier of the UE, a corresponding proximity communication service server to implement the proximity communication service of the UE.

The processor 312 may receive a request for searching a proximal user from the UE through the application, search the user within a predetermined range in accordance with a position of the UE or an IP address, determine a user identifier of the search user or determine the user identifier of the search user in accordance with the received request for searching the proximal user, determine a proximity communication service identifier of the searched user in accordance with the user identifier, determine the proximity communication service server of the UE in accordance with the proximity communication service identifier of the UE, determine, by the proximity communication service server of the UE, that the UE has the privilege to search the proximal user, search, by the proximity communication service server of the UE, corresponding proximity communication service servers in accordance with the proximity communication service identifier of the search user and send a discovery request to these proximity communication service servers, receive a discovery result returned by the proximity communication service server of the UE after the proximity communication service servers determine that the corresponding user is allowed to be discovered and return the corresponding position information about the user, and send the discovery result to the UE.

The processor 312 may receive the request for establishing the proximity communication service from the UE through the application, determine the corresponding proximity communication service identifier in accordance with the user identifier of the target UE, determine the proximity communication service server of the UE in accordance with the proximity communication service identifier of the UE, send the connectivity request for the proximity communication service to the proximity communication service server of the UE, after the proximity communication service server of the UE determines that the condition for establishing the proximity communication connection between the UE and the target UE is met, request, by the proximity communication service server of the UE, the network to assign the resources desired for establishing the proximity communication connection for the UE and the target UE, establish the proximity communication connection, receive the message about the successful establishment of the proximity communication connection returned by the proximity communication service server of the UE, and return the message about the successful establishment of the proximity communication connection to the terminal.

When the device is a proximity communication service server, the processor 312 may receive the request for the proximity communication service from the UE, or the request for the proximity communication service forwarded by the MME after it receives the request for the proximity communication service from the UE, and implement the proximity communication service of the UE in accordance with the proximity communication service identifier of the UE.

The processor 312 may receive from the UE the user search request carrying the proximity communication service identifier of the UE, the proximity communication service identifier of the target UE and the application identifier for triggering the search, after it is determined that the application is allowed to use the proximity communication service in accordance with the application identifier, send the user search request to the proximity communication service server of the target UE, receive, by the proximity communication service server of the UE, the current position of the target UE returned by the proximity communication service server of the target UE after it determines that the target UE is allowed to be discovered in accordance with the proximity communication service identifier of the target UE, determine whether or not the target UE can be discovered in accordance with the positions of the two terminals, and return the discovery result to the UE.

The processor 312 may receive from the UE the user search request carrying the proximity communication service identifier of the UE, the application layer user identifier of the target UE and the application identifier for triggering the search, inquire the DNS Server in accordance with the application layer user identifier of the target UE or acquire the proximity communication service identifier of the target UE in accordance with the application server identified with the application identifier, after it is determined that the application is allowed to use the proximity communication service in accordance with the application identifier, send the user search request to the proximity communication service server of the target UE, receive, by the proximity communication service server of the UE, the current position of the target UE returned by the proximity communication service server of the target UE after it determines that the target UE is allowed to be discovered in accordance with the proximity communication service identifier of the target UE, determine whether or not the target UE can be discovered in accordance with the positions of the two terminals, and return the discovery result to the UE.

The processor 312 may receive from the UE the request for establishing the proximity communication service carrying the proximity communication service identifier of the UE, the proximity communication service identifier of the target UE and the application identifier for triggering the establishment of the proximity communication service, send the request for establishing the proximity communication service to the proximity communication service server of the target UE, receive, by the proximity communication service server of the UE, the current position of the target UE returned by the proximity communication service server of the target UE after it determines that the target UE is allowed to establish the proximity communication connection, after it is determined that the condition for establishing the proximity communication connection between the UE and the target UE is met, request, by the proximity communication service server of the UE, the network to assign the resources desired for establishing the proximity communication connection for the UE and the target UE, establish the proximity communication connection, and return the message about the successful establishment of the proximity communication connection to the UE.

The processor 312 may receive from the UE the request for establishing the proximity communication service carrying the proximity communication service identifier of the UE, the application layer user identifier of the target UE and the application identifier for triggering the establishment of the proximity communication service, inquire the DNS Server in accordance with the application layer user identifier of the target UE or acquire the proximity communication service identifier of the target UE in accordance with the application server identified with the application identifier, send the request for establishing the proximity communication service to the proximity communication service server of the target UE, receive, by the proximity communication service server of the UE, the current position of the target UE returned by the proximity communication service server of the target UE after it determines that the target UE is allowed to establish the proximity communication connection, after it is determined that the condition for establishing the proximity communication connection between the UE and the target UE is met, request, by the proximity communication service server of the UE, the network to assign the resources desired for establishing the proximity communication connection for the UE and the target UE, establish the proximity communication connection, and return the message about the successful establishment of the proximity communication connection to the UE.

When determining that the condition for establishing the proximity communication connection between the UE and the target UE is met, the processor 312 is specifically configured to: determine that the proximity communication connection has been established between the UE and the target UE; or after determining that the UE has the privilege to establish the proximity communication service, search a corresponding proximity communication service server in accordance with the proximity communication service identifier of the target UE, send a discovery request to the proximity communication service server, after the proximity communication service server of the target UE determines that the target UE has the privilege to establish the proximity communication service, return the position information about the target UE, and determine that the proximity communication connection can be established between the UE and the target UE in accordance with the subscription information about the proximity communication service of the UE, the position information about the UE, and the position information about the target UE.

When requesting the network to assign the resources desired for establishing the proximity communication connection for the UE and the target UE and establishing the proximity communication connection, the processor 312 is specifically configured to: after it is determined that the UE is allowed to establish the proximity communication connection, send a connectivity request for the proximity communication service to an MME of the UE, request, by the MME of the UE, the network to assign the resources desired for establishing the proximity communication connection for the UE, and return the information desired for establishing the proximity communication connection; and send the connectivity request carrying the information assigned for the UE and desired for establishing the proximity communication connection to the proximity communication service server of the target UE, request, by the proximity communication service server of the target UE, the network to assign the resources desired for establishing the proximity communication connection for the target UE, and establish the proximity communication connection.

According to the method and the device for implementing the proximity communication service in the embodiments of the present disclosure, when the UE subscribes for the proximity communication service, the proximity communication service identifier is allocated to the UE. In this way, after receiving the request for the proximity communication service from the UE, the proximity communication service identifier of the UE may be determined in accordance with the request, and then the proximity communication service may be implemented in accordance with the proximity communication service identifier. As a result, it is able to prevent the situation where the proximity communication service cannot be implemented when the UE's 3GPP network layer identifier cannot be determined in accordance with the UE's application layer identifier, thereby to implement the proximity communication service of the UE.

It should be appreciated that, the present invention may be provided as a method, a system or a computer program product, so the present invention may be in the form of full hardware embodiments, full software embodiments, or combinations thereof. In addition, the present invention may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A method for implementing a proximity communication service, comprising steps of:
receiving a request for the proximity communication service from a User Equipment (UE);
in accordance with the request for the proximity communication service from the UE, determining a proximity communication service identifier obtained when the UE subscribes for the proximity communication service; and
in accordance with the proximity communication service identifier of the UE, implementing the proximity communication service,
wherein the step of receiving the request for the proximity communication service from the UE comprises receiving, by a proximity communication service server, the request for the proximity communication service from the UE, or receiving, by the proximity communication service server, the request for the proximity communication service forwarded by an MME after it receives the request for the proximity communication service from the UE, and
the step of, in accordance with the proximity communication service identifier of the UE, implementing the proximity communication service comprises: implementing, by the proximity communication service server, the proximity communication service of the UE in accordance with the proximity communication service identifier of the UE,
wherein the step of receiving, by the proximity communication service server, the request for the proximity communication service from the UE comprises receiving, by the proximity communication service server, a user search request from the UE, the proximity communication service identifier of the UE, a proximity communication service identifier of a target UE and an application identifier for triggering the search being carried in the search request, and
the step of implementing, by the proximity communication service server, the proximity communication service of the UE in accordance with the proximity communication service identifier of the UE comprises: after the proximity communication service server determines that the application is allowed to use the proximity communication service in accordance with the application identifier, sending, by the proximity communication service server, the user search request to a proximity communication service server of the target UE, and receiving, by the proximity communication service server of the UE, a current position of the target UE returned by the proximity communication service server of the target UE after it determines that the target UE is allowed to be discovered in accordance with the proximity communication service identifier of the target UE; and returning, by the proximity communication service server, a discovery result to the UE after determining whether or not the target UE can be discovered in accordance with positions of the two UEs, or,
the step of receiving, by the proximity communication service server, the request for the proximity communication service from the UE comprises receiving, by the proximity communication service server, a user search request from the UE, the proximity communication service identifier of the UE, an application layer user identifier of a target UE and an application identifier for triggering the search being carried in the search request, and
the step of implementing, by the proximity communication service server, the proximity communication service of the UE in accordance with the proximity communication service identifier of the UE comprises: inquiring, by the proximity communication service server, a Domain Name Service (DNS) Server in accordance with the application layer user identifier of the target UE, or acquiring the proximity communication service identifier of the target UE in accordance with an application server identified with the application identifier; sending the search request to a proximity communication service server of the target UE, by the proximity communication service server after it determines that the application is allowed to use the proximity communication service in accordance with the application identifier, and receiving, by the proximity communication service server of the UE, a current position of the target UE returned by the proximity communication service server of the target UE after it determines that the target UE is allowed to be discovered in accordance with the proximity communication service identifier of the target UE; and returning, by the proximity communication service server, a discovery result to the UE after determining whether or not the target UE can be discovered in accordance with positions of the two UEs.

2. The method according to claim 1, wherein the step of, in accordance with the request for the proximity communication service from the UE, determining the proximity communication service identifier obtained when the UE subscribes for the proximity communication service comprises:
acquiring the proximity communication service identifier carried in the request for the proximity communication service from the UE; or
in accordance with an application layer user identifier carried in the request for the proximity communication service from the UE, determining the proximity communication service identifier obtained when the UE subscribes for the proximity communication service.

3. The method according to claim 1, wherein the proximity communication service identifier obtained when the UE subscribes for the proximity communication service is bound to, and stored in, subscription information about the UE.

4. The method according to claim 1, wherein
the step of, receiving the request for the proximity communication service from the UE comprises receiving, by an application server, the request for the proximity communication service from the UE through an application, and
the step of, in accordance with the proximity communication service identifier of the UE, implementing the proximity communication service comprises selecting, by the application server, a corresponding proximity communication service server in accordance with the proximity communication service identifier of the UE so as to implement the proximity communication service of the UE.

5. The method according to claim 4, wherein
the step of receiving, by the application server, the request for the proximity communication service from the UE through the application comprises receiving, by the application server, a request for searching a proximal user from the UE through the application, and
the step of, in accordance with the proximity communication service identifier of the UE, implementing the proximity communication service comprises:
searching, by the application server, a user within a predetermined range in accordance with a position or an Internet Protocol (IP) address of the UE, and determining a user identifier of each searched user, or determining, by the application server, the user identifier of each searched user in accordance with the received request for searching the proximal user,
determining, by the application server, a proximity communication service identifier of the searched user in accordance with the user identifier;
determining, by the application server, a proximity communication service server of the UE in accordance with the proximity communication service identifier of the UE, determining that the UE has a privilege to search the proximal user through the proximity communication service server of the UE, searching a corresponding proximity communication service server in accordance with the proximity communication service identifier of each searched user through the proximity communication service server of the UE, sending a discovery request to each corresponding proximity communication service server, and receiving a discovery result returned by the proximity communication service server of the UE after receiving a corresponding user's position information returned by each proximity communication service server after it determines that the corresponding user is allowed to be discovered; and
sending, by the application server, the discovery result to the UE.

6. The method according to claim 4, wherein
the step of receiving, by the application server, the request for the proximity communication service from the UE through an application comprises receiving, by the application server, a request for establishing the proximity communication service from the UE via the application, and
the step of, in accordance with the proximity communication service identifier of the UE, implementing the proximity communication service comprises:
determining, by the application server, a corresponding proximity communication service identifier in accordance with a user identifier of a target UE;
determining, by the application server, a proximity communication service server of the UE in accordance with the proximity communication service identifier of the UE, sending a connectivity request for the proximity communication service to the proximity communication service server of the UE, and requesting, by the proximity communication service server of the UE, a network to assign resources desired for establishing the proximity communication connection for the UE and the target UE after the proximity communication service server of the UE determines that a condition for establishing the proximity communication connection between the UE and the target UE is met, and establishing the proximity communication connection;
receiving, by the application server, a message about the successful establishment of the proximity communication connection returned by the proximity communication service server of the UE; and
returning, by the application server, the message about the successful establishment of the proximity communication connection to the UE.

7. The method according to claim 6, wherein the step of determining, by the proximity communication service server of the UE, that the condition for establishing the proximity communication connection between the UE and the target UE is met comprises:
determining, by the proximity communication service server of the UE, that the proximity communication connection has been established between the UE and the target UE; or
after the proximity communication service server of the UE determines that the UE has a privilege to establish the proximity communication service, searching a corresponding proximity communication service server in accordance with a proximity communication service identifier of the target UE, sending a discovery request to the proximity communication service server, returning position information about the target UE to the proximity communication service server of the UE after the proximity communication service server of the target UE determines that the target UE has the privilege to establish the proximity communication service, and determining, by the proximity communication service server of the UE, that the proximity communication connection can be established between the UE and the target UE in accordance with subscription information and position information about the proximity communication service of the UE, and position information about the target UE.

8. The method according to claim 6, wherein the step of requesting, by the proximity communication service server of the UE, the network to assign the resources desired for the establishment of the proximity communication connection for the UE and the target UE and establishing the proximity communication connection comprises:
sending, by the proximity communication service server of the UE, the connectivity request for the proximity communication service to a Mobile Management Entity (MME) to which the UE belongs,
requesting, by the MME to which the UE belongs, the network to assign the resources desired for the proximity communication connection for the UE and returning information assigned for the UE and desired for the establishment of the proximity communication connection to the proximity communication service server of the UE,
sending, by the proximity communication service server of the UE, the connectivity request for the proximity communication service carrying the information assigned for the UE and desired for the establishment of the proximity communication connection, to the proximity communication service server of the target UE,
requesting, by the proximity communication service server of the target UE, the network to assign resources desired for the establishment of the proximity communication connection for the target UE,
and establishing the proximity communication connection.

9. The method according to claim 1, wherein
the step of receiving, by the proximity communication service server, the request for the proximity communication service from the UE comprises
receiving, by the proximity communication service server, a request for establishing the proximity communication service from the UE, the proximity communication service identifier of the UE, a proximity communication service identifier of a target UE and an application identifier for triggering an establishment of the proximity communication service being carried in the request for establishing the proximity communication service, and
the step of implementing, by the proximity communication service server, the proximity communication service of the UE in accordance with the proximity communication service identifier of the UE comprises:
sending, by the proximity communication service server, the request for establishing the proximity communication service to a proximity communication service server of the target UE, and receiving, by the proximity communication service server of the UE, a current position of the target UE returned by the proximity communication service server of the target UE after it determines that the target UE is allowed to establish the proximity communication connection;
after the proximity communication service server determines that a condition for establishing the proximity communication connection between the UE and the target UE is met, requesting, by the proximity communication service server of the UE, a network to assign resources desired for establishing the proximity communication connection for the UE and the target UE, and establishing the proximity communication connection; and
returning, by the proximity communication service server, a message about the successful establishment of the proximity communication connection to the UE,
or,
the step of receiving, by the proximity communication service server, the request for the proximity communication service from the UE comprises
receiving, by the proximity communication service server, a request for establishing the proximity communication service from the UE, the proximity communication service identifier of the UE, an application layer user identifier of a target UE and an application layer identifier for triggering the establishment of the proximity communication service being carried in the request, and
the step of implementing, by the proximity communication service server, the proximity communication service of the UE in accordance with the proximity communication service identifier of the UE comprises:
inquiring, by the proximity communication service server, a DNS Server in accordance with the application layer user identifier of the target UE, or acquiring the proximity communication service identifier of the target UE in accordance with an application server identified with the application identifier;
sending, by the proximity communication service server, the request for establishing the proximity communication service to a proximity communication service server of the target UE, and receiving, by the proximity communication service server of the UE, a current position of the target UE returned by the proximity communication service server of the target UE after it determines that the target UE is allowed to establish the proximity communication connection;
after the proximity communication service server determines that a condition for establishing the proximity communication connection between the UE and the target UE is met, requesting, by the proximity communication service server of the UE, a network to assign resources desired for establishing the proximity communication connection for the UE and the target UE, and establishing the proximity communication connection; and
returning, by the proximity communication service server, a message about the successful establishment of the proximity communication connection to the UE.

10. The method according to claim 9, wherein the step of determining, by the proximity communication service server, that the condition for establishing the proximity communication connection between the UE and the target UE is met comprises:
determining, by the proximity communication service server, that the proximity communication connection has been established between the UE and the target UE; or
after the proximity communication service server determines that the UE has a privilege to establish the proximity communication service, searching a corresponding proximity communication service server in accordance with the proximity communication service identifier of the target UE, sending a discovery request to the proximity communication service server, receiving position information about the target UE returned after the proximity communication service server of the target UE determines that the target UE has the privilege to establish the proximity communication service, and determining, by the proximity communication service server, that the proximity communication connection can be established between the UE and the target UE in accordance with subscription information about the proximity communication service and position information of the UE, and position information about the target UE.

11. The method according to claim 9, wherein the step of requesting, by the proximity communication service server, the network to assign the resources desired for establishing the proximity communication connection for the UE and the target UE and establishing the proximity communication connection comprises:
   sending, by the proximity communication service, a connectivity request for the proximity communication service to an MME to which the UE belongs after determining that the proximity communication connection can be established, requesting, by the MME to which the UE belongs, the network to assign the resources desired for establishing the proximity communication connection for the UE, and returning information desired for establishing the proximity communication connection; and
   sending, by the proximity communication service server, the connectivity request for the proximity communication service carrying the information assigned for the UE and desired for establishing the proximity communication connection to the proximity communication service server of the target UE, requesting, by the proximity communication service server of the target UE, the network to assign the resources desired for establishing the proximity communication connection for the target UE, and establishing the proximity communication connection.

12. A device for implementing a proximity communication service, comprising a memory and a processor, wherein the processor is configured with a computer program for executing the following functions:
   receiving a request for the proximity communication service from a User Equipment (UE);
   determining a proximity communication service identifier obtained when the UE subscribes for the proximity communication service in accordance with the request for the proximity communication service from the UE; and
   implementing the proximity communication service in accordance with the proximity communication service identifier of the UE, and
   the memory is configured to store codes of the computer program,
   wherein when the device is a proximity communication service server, the processor is configured to receive the request for the proximity communication service from the UE, or the request for the proximity communication service forwarded by a Mobile Management Entity (MME) after it receives the request for the proximity communication service from the UE, and implement the proximity communication service of the UE in accordance with the proximity communication service identifier of the UE,
   wherein the processor is further configured to: receive from the UE a user search request carrying the proximity communication service identifier of the UE, a proximity communication service identifier of a target UE and an application identifier for triggering the search; after it is determined that the application is allowed to use the proximity communication service in accordance with the application identifier, send the user search request to a proximity communication service server of the target UE, receive, by the proximity communication service server of the UE, a current position of the target UE returned by the proximity communication service server of the target UE after it determines that the target UE is allowed to be discovered in accordance with the proximity communication service identifier of the target UE; and after it is determined whether or not the target UE can be discovered in accordance with the positions of the two UEs, and return a discovery result to the UE,
   or,
   the processor is further configured to: receive from the UE a user search request carrying the proximity communication service identifier of the UE, an application layer user identifier of a target UE and an application identifier for triggering the search: inquire a Domain Name Service (DNS) Server in accordance with the application layer user identifier of the target UE or acquire the proximity communication service identifier of the target UE in accordance with the application server identified with the application identifier; send the user search request to the proximity communication service server of the target UE after it is determined that the application is allowed to use the proximity communication service in accordance with the application identifier, receive, by the proximity communication service server of the UE, a current position of the target UE returned by the proximity communication service server of the target UE after it determines that the target UE is allowed to be discovered in accordance with the proximity communication service identifier of the target UE; and return a discovery result to the UE after it is determined whether or not the target UE can be discovered in accordance with the positions of the two UEs.

13. The device according to claim 12, wherein the processor is further configured to:
   acquire the proximity communication service identifier carried in the request for the proximity communication service from the UE; or
   determine the proximity communication service identifier obtained when the UE subscribes for the proximity communication service in accordance with an application layer user identifier carried in the request for the proximity communication service from the UE.

14. The device according to claim 12, wherein the proximity communication service identifier obtained when the UE subscribes for the proximity communication service is bound to, and stored in, the subscription information about the UE.

15. The device according to claim 12, wherein when the device is an application server, the processor is configured to
   receive the request for the proximity communication service from the UE through an application, and
   select, in accordance with the proximity communication service identifier of the UE, a corresponding proximity communication service server to implement the proximity communication service of the UE.

16. The device according to claim 15, wherein the processor is further configured to:
   receive a request for searching a proximal user from the UE through the application;

search a user within a predetermined range in accordance with a position or an Internet Protocol (IP) address of the UE, and determine a user identifier of each search user or determine, by the application server, the user identifier of the searched user in accordance with the received request for searching the proximal user;

determine a proximity communication service identifier of the searched user in accordance with the user identifier;

determine the proximity communication service server of the UE in accordance with the proximity communication service identifier of the UE, determine, by the proximity communication service server of the UE, that the UE has a privilege to search the proximal user, search, by the proximity communication service server of the UE, a corresponding proximity communication service server in accordance with the proximity communication service identifier of each searched user and send a discovery request to each proximity communication service server, receive a discovery result returned by the proximity communication service server of the UE after receiving a corresponding user's position information returned by each proximity communication service server after it determines that the corresponding user is allowed to be discovered; and send the discovery result to the UE.

17. The device according to claim 15, wherein the processor is further configured to:

receive a request for establishing the proximity communication service from the UE through the application;

determine a corresponding proximity communication service identifier in accordance with the user identifier of a target UE;

determine a proximity communication service server of the UE in accordance with the proximity communication service identifier of the UE, send a connectivity request for the proximity communication service to the proximity communication service server of the UE, and after the proximity communication service server of the UE determines that a condition for establishing the proximity communication connection between the UE and the target UE is met, request, by the proximity communication service server of the UE, a network to assign resources desired for establishing the proximity communication connection for the UE and the target UE, and establish the proximity communication connection;

receive a message about the successful establishment of the proximity communication connection returned by the proximity communication service server of the UE; and return the message about the successful establishment of the proximity communication connection to the UE.

18. The device according to claim 12, wherein the processor is further configured to:

receive from the UE a request for establishing the proximity communication service carrying the proximity communication service identifier of the UE, a proximity communication service identifier of a target UE and an application identifier for triggering the establishment of the proximity communication service;

send the request for establishing the proximity communication service to a proximity communication service server of the target UE, receive, by the proximity communication service server of the UE, a current position of the target UE returned by the proximity communication service server of the target UE after it determines that the target UE is allowed to establish the proximity communication connection;

after it is determined that a condition for establishing the proximity communication connection between the UE and the target UE is met, request, by the proximity communication service server of the UE, a network to assign resources desired for establishing the proximity communication connection for the UE and the target UE, establish the proximity communication connection; and return a message about the successful establishment of the proximity communication connection to the UE, or, the processor is further configured to:

receive from the UE a request for establishing the proximity communication service carrying the proximity communication service identifier of the UE, an application layer user identifier of a target UE and an application identifier for triggering the establishment of the proximity communication service;

inquire a DNS Server in accordance with the application layer user identifier of the target UE or acquire the proximity communication service identifier of the target UE in accordance with the application server identified with the application identifier;

send the request for establishing the proximity communication service to a proximity communication service server of the target UE, receive, by the proximity communication service server of the UE, a current position of the target UE returned by the proximity communication service server of the target UE after it determines that the target UE is allowed to establish the proximity communication connection;

after it is determined that the condition for establishing the proximity communication connection between the UE and the target UE is met, request, by the proximity communication service server of the UE, a network to assign resources desired for establishing the proximity communication connection for the UE and the target UE, establish the proximity communication connection; and return a message about the successful establishment of the proximity communication connection to the UE.

19. The device according to claim 18, wherein when determining that the condition for establishing the proximity communication connection between the UE and the target UE is met, the processor is further configured to:

determine that the proximity communication connection has been established between the UE and the target UE; or after determining that the UE has a privilege to establish the proximity communication service, search a corresponding proximity communication service server in accordance with the proximity communication service identifier of the target UE, send a discovery request to the proximity communication service server, receive position information about the target UE returned after the proximity communication service server of the target UE determines that the target UE has a privilege to establish the proximity communication service, and determine that the proximity communication connection can be established between the UE and the target UE in accordance with subscription information about the proximity communication service of the UE, position information about the UE, and the position information about the target UE.

20. The device according to claim 18, wherein when requesting the network to assign the resources desired for establishing the proximity communication connection for the UE and the target UE and establishing the proximity communication connection, the processor is further configured to:
- after determining that the UE is allowed to establish the proximity communication connection, send a connectivity request for the proximity communication service to an MME of the UE, request, by the MME of the UE, a network to assign resources desired for establishing the proximity communication connection for the UE, and return the information desired for establishing the proximity communication connection; and
- send the connectivity request carrying the information assigned for the UE and desired for establishing the proximity communication connection to the proximity communication service server of the target UE, request, by the proximity communication service server of the target UE, the network to assign the resources desired for establishing the proximity communication connection for the target UE, and establish the proximity communication connection.

\* \* \* \* \*